United States Patent
Raghavan et al.

(10) Patent No.: US 7,754,269 B2
(45) Date of Patent: *Jul. 13, 2010

(54) FLAVORED SUGARCANE JUICE IN ASEPTIC UNIT PACKS

(75) Inventors: Bashyam Raghavan, Karnataka (IN); Mysore Nagarajarao Ramesh, Karnataka (IN); Kulathooran Ramalakshmi, Karnataka (IN); Nanjundaiah Krishnamurthy, Karnataka (IN); Prakash Muralidhar Badgujar, Karnataka (IN); Vishweshwaraiah Prakash, Karnataka (IN)

(73) Assignee: Council of Scientific and Industrial Research, New Delhi (IN)

( * ) Notice: Subject to any disclaimer, the term of this patent is extended or adjusted under 35 U.S.C. 154(b) by 1020 days.

This patent is subject to a terminal disclaimer.

(21) Appl. No.: 11/154,737

(22) Filed: Jun. 17, 2005

(65) Prior Publication Data

US 2006/0083835 A1 Apr. 20, 2006

Related U.S. Application Data

(63) Continuation of application No. PCT/IB02/05411, filed on Dec. 17, 2002.

(51) Int. Cl.
*A23L 2/00* (2006.01)
(52) U.S. Cl. ............... 426/590; 426/531; 426/599; 426/521
(58) Field of Classification Search ........... 426/590, 426/262, 658, 481, 599, 665
See application file for complete search history.

(56) References Cited

U.S. PATENT DOCUMENTS

| 1,273,145 A | * | 7/1918 | Burdick et al. | ....... 426/598 |
| 4,784,859 A | * | 11/1988 | Lashley | ....... 426/11 |
| 6,068,869 A | * | 5/2000 | Bent Ginslov | ....... 426/262 |
| 6,723,367 B2 | * | 4/2004 | Singh et al. | ....... 426/590 |

FOREIGN PATENT DOCUMENTS

| IN | 184435 | 8/2000 |
| WO | WO 00/02000 | 1/2000 |
| WO | WO 00/58525 | 10/2000 |

OTHER PUBLICATIONS

O.P. Chauhan Studies on Preservation of Sugarcane Juice, p. 218, 227.*
Sivasubramanian, C.G. et al., Effect of Heat Treatments on the Quality of Sugarcane Juice, *Indian Food Packer*, pp. 51-54 (1994).
Chauhan, O.P. et al., "Studies on Preservation of Sugarcane Juice," *Intl. J. of Food Properties*, vol. 5, No. 1, pp. 217-229 (2002).
Mann, R.S. et al., "Processing, Packaging and Preservation of Sugarcane Juice," *Indian Farming*, vol. 37, pp. 15-17 (1988).
Bhupinder, K., et al., "Studies on the Development and Storage Stability of Ready-to-Serve Bottled Sugarcane Juice," *Intern. J. Trop. Agric.*, vol. 9, No. 2, pp. 128-134 (1991).
Kapur, K.L., et al., "Preliminary Studies on Preservation of Sugarcane Juice," *Indian Food Packer*, vol. 32, No. 2, pp. 32-33 (1978).

* cited by examiner

*Primary Examiner*—Drew E Becker
*Assistant Examiner*—Preston Smith
(74) *Attorney, Agent, or Firm*—Winston & Strawn LLP

(57) ABSTRACT

The present invention provides a method wherein flavored sugarcane juice containing 18-20% soluble solids and can be preserved after suitable dilution in aseptic unit packs.

6 Claims, 2 Drawing Sheets

FLAVORED SUGARCANE JUICE IN ASEPTIC UNIT PACKS

CROSS-REFERENCE TO RELATED APPLICATIONS

This application is a continuation of PCT International Application No. PCT/IB2002/005411, filed on Dec. 17, 2002, the disclosure of which is expressly incorporated herein by reference.

TECHNICAL FIELD

This invention relates to a process for preservation of sugarcane juice. The process, in particular, relates to the method of preservation of flavored sugarcane juice in aseptic unit packs. By following the process of the present invention, sugarcane juice containing 18-20% soluble solids and can be preserved after suitable dilution. The product is derived purely from natural plant material and imparts health benefits to the consumers. The juice with its delicate aroma is a refreshing beverage, which the consumers prefer to synthetically flavored beverages.

BACKGROUND ART

India is the original home of sugarcane and second largest producer next to Brazil. Presently, India produces about 280 million tons of sugarcane in an area of 4 million hectares. About 10-12% is available for the manufacture of sugarcane juice.

It is a well known fact that sugarcanes are crushed to obtain juice and it is a common practice in India to dispense this juice fresh either as such or with the addition of lime juice and/or fresh ginger extract in glasses by the vendors/hawkers to the consumers. The major problem encountered in this operation is the lack of hygiene resulting in contamination of the juice with the heavy load of microorganisms, which arise due to improper cleaning of the sugarcanes and handling of the finished product. Raw sugarcane juice is a carbohydrate rich, low acid food and is therefore susceptible to the growth of yeasts, of spoilage bacteria and also of pathogenic bacteria. Pathogens such as *Salmonella, S. aureus*, and *C, perfringens* are able to grow and proliferate at a pH of more than 4.6. Contamination of raw juice by these bacteria can occur by the food handlers, by the equipment used or by the environment in which it is prepared. Such freshly crushed juice cannot be preserved even for a few hours since it is known to ferment very quickly.

Attempts have been made by many to develop a process for preserving the sugarcane juice. Yet there is no knowledge/information regarding its manufacture and sale in any form of packaging material commercially.

Reference may be made to CFTRI process (Shankaranarayana, M. L., Abraham, K. G., and Raghavan, B., CFTRI Annual Report, 1986-87, p 70) wherein the juice was subjected to pasteurization at 70° C. for 10 min. The drawback with the product was browning and formation of off-flavor not acceptable to consumers.

Reference may be made to Mann and Singh (Mann, R. S., and Singh, S., *Indian Farming*, 37; 15, 1988) wherein the diluted sugarcane juice containing citric acid and salt was pasteurized in order to overcome deleterious effects on the consumers. The drawback of the process was the absence of class II preservatives and low pasteurization temperature, which resulted in quicker spoilage even at refrigerated temperature.

Reference may be made to Bhupinder et al. (Bhupinder, K., Sehgal, V. K, Sekhon, K. S., and Sharma, K., Proc II IFCON, CFTRI, 1988, p. 105) wherein a ready to serve bottled sugarcane juice beverage was developed. The drawback of this process was the absence of citric acid in the beverage and also pasteurization for 10 minutes at 80° C. which is insufficient to preserve the beverage. Also, this is in-pack sterilization and not aseptic unit packs and hence is different from the present invention.

Reference may also be made to Bhupinder et al. (Bhupinder, K., Sharma, K. P., and Harinder, K., *Int. J Trop Agric.*, 9, p. 128, 1991) wherein the above process was slightly modified by addition of potassium metabisulphite (sulphur dioxide 70 ppm) and bottling followed by sterilization for 30 minutes. The drawback with this process was extended pasteurization time, which will result in flavor deterioration.

Reference may be made to another process involving direct heating of the juice to 85° C. for one minute (Sivasubramanian, G. and Pai, J. S., *Ind. Food Packer*, XLVIII (2), 51, 1994). But the resultant product had an off-flavor on storage.

Among the patents related to sugarcane juice that are available, one relates to a method for preparing a sugarcane juice based fruit juice and a drink containing said juice (L. Fahrasmane and M. Catherine, W02000FR0000765, Oct. 5, 2000/ Mar. 27, 2000). The above invention consists of at least one tangential filtration stage for a dry pressed raw sugarcane extract. One more Indian patent has also been filed under the title "Preservation process for improved shelf life of sugarcane juice (pure)" (K. P. Sharma, 184435, Aug. 26, 2000).

It is evident from the above cited literature that there is a need in the industry for flavored sugarcane juice in aseptic unit packs.

SUMMARY OF THE INVENTION

Accordingly, the present invention relates to a process for preparing flavored sugarcane juice and storage of the flavored sugarcane juice in aseptic unit packs.

BRIEF DESCRIPTION OF THE ACCOMPANYING DRAWINGS

In the drawings accompanying the specification,

DETAILED DESCRIPTION OF THE PRESENT INVENTION

The present invention is directed to providing a process for preservation of flavored sugarcane juice, typically in aseptic unit packs or other ready-to-drink packaging. Preferably, the invention can provide a compatible flavor blend comprising of ginger and lime/lemon that can be incorporated into sugarcane juice to provide a better aroma and mouth feel.

The present invention provides a process for preservation of flavored sugarcane juice, the said process comprising:

a) soaking the canes in water containing 0.1% by wt. potassium metabisulphite and 0.01% by wt. citric acid for a period of 2-4 hrs, b) washing the soaked sugarcanes of step (a) and crushing the same to obtain sugarcane juice having 18-20° Brix, and filtering the sugarcane juice, c) adjusting the total solid content of the filtered sugarcane juice of step (b) to 10-16° Brix by adding soft beverage water, d) acidifying the sugarcane juice of step (c) by adding 0.1-0.3% by wt. citric acid and 0.01-0.03% by wt. sodium citrate, e) adding to the acidified sugarcane juice of step (d) a flavor blend consisting of 0.050.20% by wt. of ginger oleoresin and/or 0.01-0.05% by wt. of essential oils of lime and lemon to obtain a flavored sugarcane juice, f) blending the flavored sugarcane juice of step (e) and pasteurizing the same at 90-110° C. for 30-180 sec to obtain the flavored sugarcane juice which may be filled in aseptic unit packs.

In an embodiment of the present invention, wherein in step (b), the sugarcanes are washed with plain water before crushing.

In another embodiment of the present invention, wherein the sugarcanes are crushed using mechanical devices.

In yet another embodiment of the present invention, wherein in step (b), the sugarcane juice is filtered using muslin cloth.

In still another embodiment of the present invention, wherein in step (c) the sugarcane juice is diluted with beverage water to adjust the sweetness at 15%.

In another embodiment of the present invention, wherein in step (d), the sugarcane juice is acidified by adding 0.2% by wt. citric acid and 0.02% by wt. sodium citrate.

Figure 1:
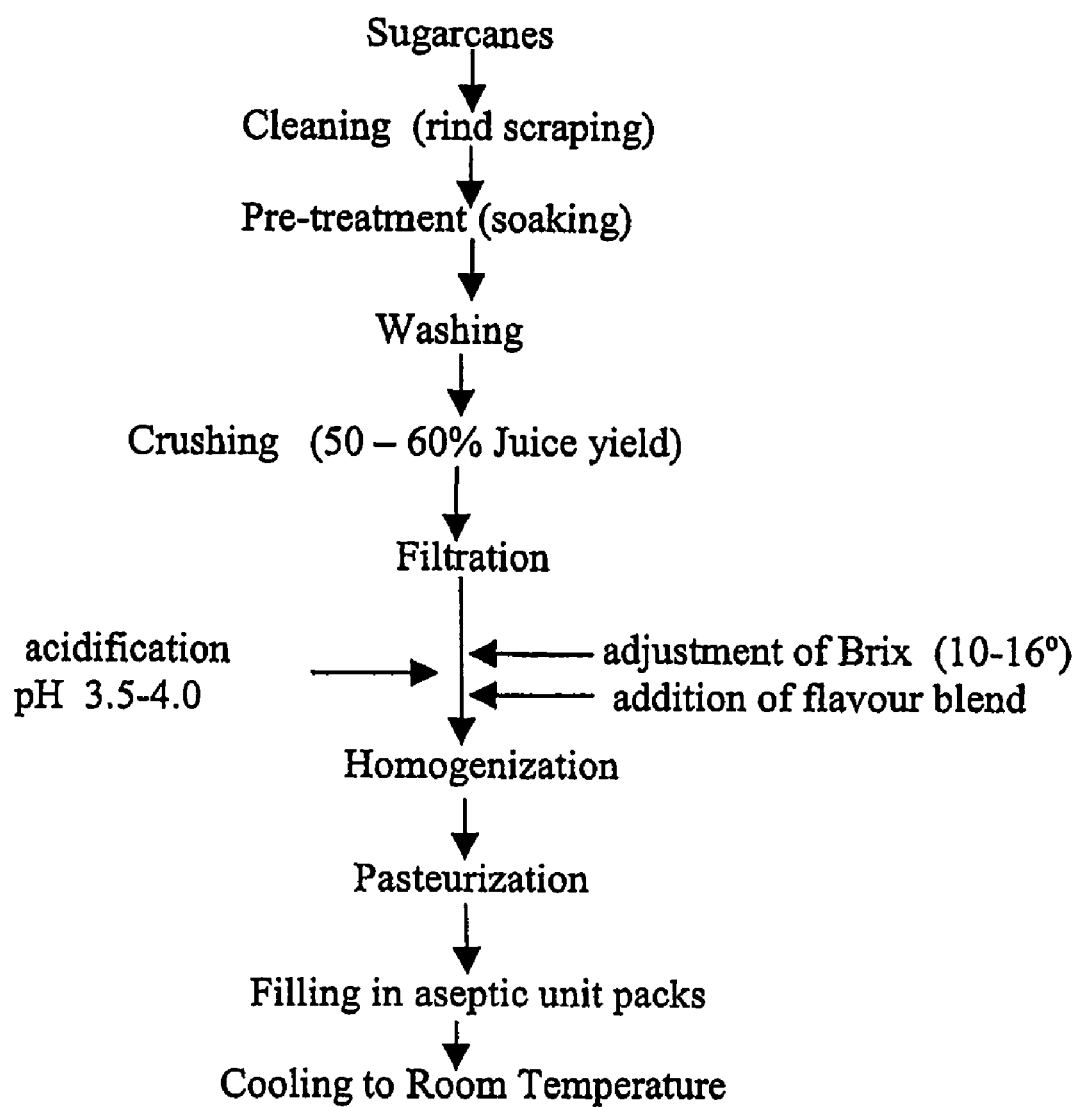
FIG. 1 represents the flow chart of the process for the preservation of sugarcane juice in aseptic unit packs.

The process for the preservation of sugarcane juice in aseptic unit packs is illustrated in FIG. 1. The novelty of the process lies in the combined manner in which critical steps such as pre-treatment of the sugarcanes, homogenization of the juice with a flavor blend consisting of ginger and lime-lemon flavors in such a manner as to dispense the flavor in the bulk of the juice and pasteurization at specific temperature for a particular duration are carried out in order to preserve the sugarcane juice. It has been found that by following the process as described above, the Inventors have been successful in preserving the natural taste of sugarcane juice without browning and off-flavoring the sugarcane juice.

The applicability of the process is further illustrated in the following examples which are given by way for illustrating the present invention in a much better manner and hence, should not be construed to limit the scope of the present invention in any manner.

Example 1

Sugarcanes (1.2 tons) were procured, roots and stems trimmed to obtain 1 ton of cleaned canes. These were soaked in KMS solution for 2 hours. Then the canes were thoroughly washed and juice extracted using the twin roller crusher with SS rollers. 500 L of juice (20° Brix) was obtained and collected in a chiller tank with re-circulation facility, maintained at 4° C. The brix was brought down to 15.4 by adding soft water (150 L). The product was thawed, pH adjusted to 3.70 by adding citric acid (0.2%) and sodium citrate (0.02%). The total quantity of juice was 650 L. After pH and brix adjustment, the juice was pumped to homogenizer at 140 bar and subsequently to sterilizer to pasteurize at 95° C. for 60 s. Pasteurized juice was stored in an aseptic tank with steam locks. Meanwhile, the filling section of the processor was sterilized with superheated water. Subsequently, the juice was filled into 250 ml aseptic unit packs.

Example 2

Sugarcanes (1.4 tons) were thoroughly cleaned to remove the waxy layer by scraping the rind. The final weight of the cleaned canes were 1050 kg and were soaked in KMS solution for 4 h. The canes were washed with running water and crushed to obtain 510 liters of juice (200 Brix). The juice was diluted to 15.2° Brix by adding soft water (160 L). Citric acid (0.2%), sodium citrate (0.02%) and flavor blend (500 ml) consisting of ginger oleoresin (70 g) duly emulsified in propylene glycol were added. The juice was pumped to homogenizer at 140 bars through de-aerator and subsequently to sterilizer and pasteurized at 105° C. for 60 s. Subsequently, the juice was filled into 250 ml aseptic unit packs.

Example 3

Figure 2:
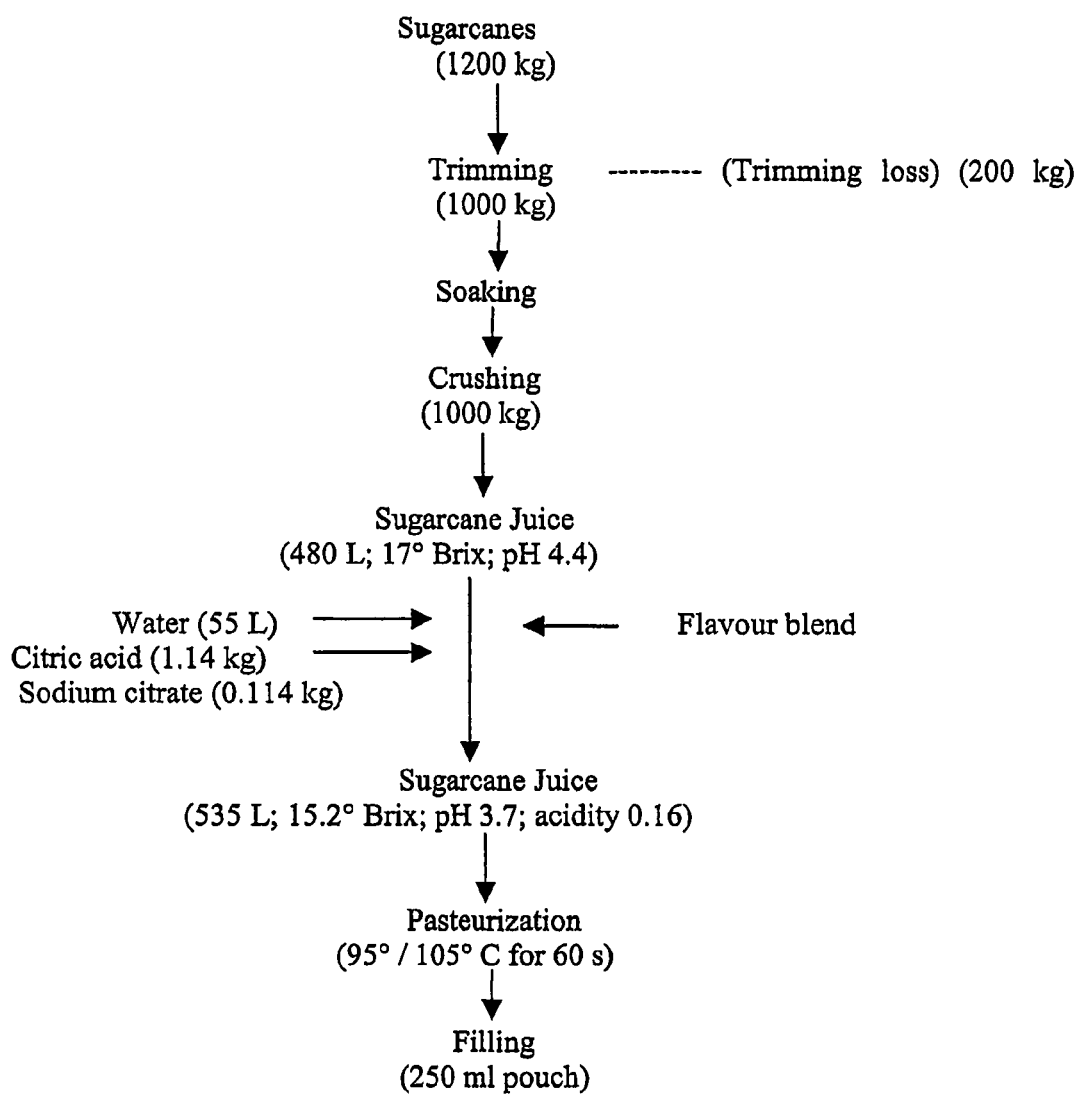
FIG. 2 shows the material balance of the constituents obtained for Example 3.

1.2 tons of canes. were procured, roots and stem were trimmed. The sugarcanes were thoroughly cleaned to remove the waxy layer by scraping the rind. The cleaned canes were soaked in KMS solution for 4 h. The canes were washed with running water, crushed to obtain about 480 liters of juice (17° Brix) followed by dilution with soft water (55 L) to adjust the brix to 15.2°. Citric acid and sodium citrate at the levels of 0.2 and 0.02% respectively and a flavor blend (500 ml) consisting of ginger oleoresin (70 g) and terpeneless lime and lemon oil (7.5 ml each) duly emulsified in propylene glycol were added to the juice and pumped to the homogenizer at 140 bars through de-aerator and subsequently to sterilizer for pasteurization at 95° C. for 60 s. Subsequently, the juice was filled into 250 ml aseptic unit packs. The material balance for example 3 is shown in FIG. 2.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A process for preservation of flavored sugarcane juice, the said process comprising: a) soaking the canes in water containing about 0.1% by wt. potassium metabisulphite and about 0.01% by wt. citric acid for a period of about 2-4 hrs, b) washing the soaked sugarcanes of step (a) and crushing the same to obtain sugarcane juice having about 18-20° Brix, and filtering the sugarcane juice, c) adjusting the total solid content of the filtered sugarcane juice of step (b) to about 10-16° Brix by adding soft beverage water, d) acidifying the sugarcane juice of step (c) by adding about 0.1-0.3% by wt. citric acid and about 0.01-0.03% by wt. sodium citrate, e) adding to the acidified sugarcane juice of step (d) a flavor blend consisting of about 0.05-0.20% by wt. of ginger oleoresin and/or about 0.01-0.05% by wt. of essential oils of lime and lemon to obtain a flavored sugarcane juice, f) blending the flavored sugarcane juice of step (e) and pasteurizing the same at about 90-110° C. for about 30-180 sec to obtain the flavored sugarcane juice which may be filled in aseptic unit packs.

2. A process as claimed in claim 1, wherein in step (b), the sugarcanes are washed with plain water before crushing.

3. A process as claimed in claim 1, wherein the sugarcanes are crushed using mechanical devices.

4. A process as claimed in claim 1, wherein in step (b), the sugarcane juice is filtered using muslin cloth.

5. A process as claimed in claim 1, wherein in step (c) the sugarcane juice is diluted with beverage water to adjust the sweetness at about 15° Brix.

6. A process as claimed in claim 1, wherein in step (d), the sugarcane juice is acidified by adding about 0.2% by wt. citric acid and about 0.02% by wt. sodium citrate.

* * * * *